UNITED STATES PATENT OFFICE 2,126,852

CARBOCYANINE DYESTUFFS AND A PROCESS OF PREPARING THEM

Paul Wolff and Adolf Sieglitz, Frankfort-on-the-Main, Germany, assignors to Agfa Ansco Corporation, Binghamton, N. Y., a corporation of New York No Drawing. Application May 10, 1934, Serial No. 725,010. In Germany May 16, 1933

7 Claims. (Cl. 260—44)

The present invention relates to carbocyanine dyestuffs and to a process of preparing them.

Hitherto carbocyanine dyestuffs have been prepared by linking together heterocyclic nitrogen compounds containing reactive methyl groups or methylene groups, in the form of their quaternary salts by means of agents such as formaldehyde, ortho-formic acid esters, sodium formate or the like.

Now, we have found that valuable dyestuffs of the carbocyanine series are obtainable by condensing in the presence or absence of a condensing agent such as, for instance, phosphorus oxychloride or piperidine, and advantageously in a solvent, such as, for instance, pyridine, nitrobenzene or acetic anhydride, an indoline compound which contains a reactive methylene group in alpha-position to the nitrogen and in which one hydrogen atom of this methylene group is replaced by the aldehyde group with the same or another heterocyclic nitrogen compound, in the form of its quaternary salt, containing in alpha- or gamma-position to the nitrogen a reactive methyl group. As aldehydes there may be mentioned, for instance, those of the following formula:

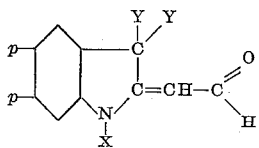

wherein X means methyl or ethyl, the two Y's mean two methyl or two ethyl groups and $p$ means hydrogen, methyl, ethyl, methoxy, ethoxy, amino, dimethylamino, diethylamino, or phenyl.

These aldehydes may be prepared as described in the application of Paul Wolff, one of the present applicants, Serial No. 725,009, filed May 10, 1934, as follows:

1.3.3-trimethyl-2-methylene-indoline is treated with formylmethylaniline in the presence of phosphorus oxychloride or thionylchloride or sulfuryl chloride by causing the components to react either alone or in an indifferent solvent. In this manner there is obtained, for instance, 1.3.3-trimethyl-indoline-2-methylene-ω-aldehyde. The process may be applied generally to indole compounds containing methylene groups which are capable of reaction.

For example, 155 parts of phosphorus oxychloride are run into 135 parts of methylformylaniline in the course of ½ hour at ordinary temperature, while stirring. The mixture is subsequently stirred for 2 hours, then diluted with 150 parts of ortho-dichlorobenzene and cooled to +5° C.; at this temperature, 170 parts of 1.3.3-trimethyl-2-methylene indoline are gradually added; after about 15 hours the batch is freed from dichlorobenzene, methylaniline and any unchanged 1.3.3-trimethyl-2-methylene indoline which might be present by alkaline steam-distillation and the non-volatile residue is dried and then recrystallized from ligroin. The 1.3.3-trimethylindoline-2-methylene-ω-aldehyde of the following constitution:

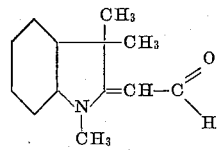

crystallizes in the form of coarse large crystals, melting at 118° C. The yield amounts to about 75% of the theoretical.

By using, instead of 1.3.3-trimethyl-2-methylene-indoline, 1-ethyl-3.3-dimethyl-2-methylene-indoline or 1.3.3-triethyl-2-methylene-indoline or 1-methyl-3.3-diethyl-2-methylene-indoline there are obtained aldehydes of similar properties.

Instead of phosphorus oxychloride, thionylchloride or sulfurylchloride may be used with a like result.

160 grams of phosphorus oxychloride are run into 140 grams of methylformylaniline in the course of ½ hour at ordinary temperature, while stirring. Stirring is continued for 3 hours, the mixture is diluted with 300 grams of chlorobenzene and cooled to +5° C. Thereupon, 200 grams of 1.3.3-trimethyl-2-methylene-5-methoxyindoline are gradually added thereto and the product is worked up as described in Example 1.

In this manner 1.3.3-trimethyl-5-methoxyindoline-2-methylene-ω-aldehyde of the following constitution

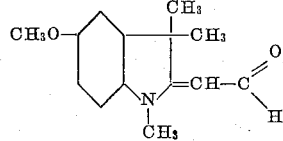

is obtained in a yield of about 70% of the theoretical. It melts at 105° C.

Similar aldehydes may be obtained by starting from indoles which contain, instead of the methoxy group, other substituents, such as, for instance, an ethoxy or an alkyl or aryl group.

Said aldehydes may be prepared by the process described in U. S. Patent No. 1,807,693 in the name of Kalischer et al. Said aldehydes and their preparation are not to be claimed in this application.

As heterocyclic nitrogen compounds in the form of their quaternary salts there may be used, for instance, those of the following formula:

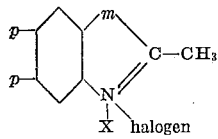

wherein X means methyl or ethyl, $m$ means one of the bivalent values $=C(methyl)_2$, —O—, —S—, —Se— and —CH=CH— and $p$ means hydrogen, methyl, ethyl, methoxy, ethoxy, amino, dimethylamino or diethylamino.

These compounds may also be used as starting materials if they are not present in the form of their quaternary salts but of the methylene bases. In this case there must be used, as described in Example 1, a condensing agent which yields hydrohalic acid. There is intermediarily formed the quaternary salt of the heterocyclic nitrogen compound.

The process of the present invention offers the great advantage over the methods hitherto known for the preparation of carbocyanine dyestuffs that it allows of obtaining in a simple manner the preparation of symmetrical as well as of unsymmetrical dyestuffs of the carbocyanine series. According to the new process dyestuffs of, for instance, the following general formula are obtained:

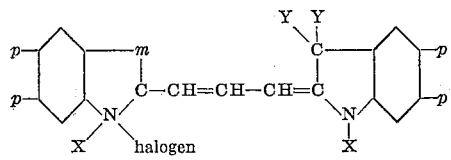

wherein X means methyl or ethyl, the two Y's mean two methyl groups or two ethyl groups, $m$ means one of the bivalent values $=C(methyl)_2$, —O—, —S—, —Se— and —CH=CH—, the compounds being substituted in at least one of the positions $p$ by methyl, ethyl, methoxy, ethoxy, amino, dimethylamino, diethylamino or phenyl.

The carbocyanine dyestuffs obtainable according to the present process are, for instance, suitable for sensitizing photographic silver halide emulsions: they may be used with special advantage for sensitizing ammonia emulsions.

The following examples serve to illustrate the invention but they are not intended to limit it thereto, the parts being by weight:

(1) 17.3 parts of 1.3.3-trimethyl-2-methylene-indoline and 20.1 parts of 1.3.3-trimethylindoline-2-methylene-ω-aldehyde are dissolved in 100 parts of benzene and 6 parts of phosphorus oxychloride are added drop by drop. Thereupon, the whole is boiled until the formation of the dyestuff is finished. The benzene is expelled. The dyestuff which has the following constitution:

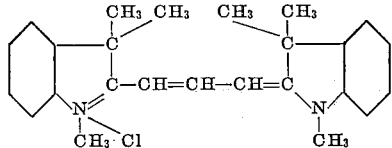

is dissolved in water and may be salted out in the form of cristals having a metallic luster. It dyes tanned cotton bright bluish-red tints and is identical with the dyestuff obtainable by reaction of 1.3.3-trimethyl-2-methylene-indoline with sodium formiate in the presence of acetic anhydride.

By using an aldehyde in which the methyl groups are replaced by ethyl groups or which is substituted in the benzene nucleus by a substituent as, for instance, a nitro, amino, alkyl or O-alkyl group, dyestuffs of similar properties are obtained.

(2) 20 parts of 1.3.3-trimethylindoline-2-methylene-ω-aldehyde and 20 parts of 1.3.3-trimethyl-5-methoxy-2-methylene-indoline are dissolved in 100 parts of benzene and condensed, as described in Example 1, with addition of 6 parts of phosphorus oxychloride. There is obtained a water-soluble basic dyestuff which has a somewhat bluer tint than rhodamine and by far surpasses it as regards clearness of shade and fastness to light.

(3) By condensing 23 parts of 1.3.3-trimethyl-5-methoxy-indoline-2-methylene-ω-aldehyde and 20 parts of 1.3.3-trimethyl-5-methoxy-2-methylene-indoline as described in Example 1, there is obtained a water-soluble basic violet dyestuff which has good fastness properties and by far surpasses the hitherto known basic violet dyestuffs as regards clearness of shade.

(4) 30.5 parts of 2-methyl-benzthiazol-iodine-ethylate and 20.1 parts of 1.3.3-trimethylindoline-2-methylene-ω-aldehyde are dissolved in 500 parts of anhydrous pyridine and boiled under reflux for 1½ hours whereby the formation of the dyestuff is finished. The pyridine is expelled and the dyestuff is recrystallized from alcohol. It dyes wool and tanned cotton bluish-red tints. By replacing 2-methylbenzthiazol-iodine-ethylate by other halogen alkylates of 2-methylbenzthiazol similar dyestuffs are obtained.

(5) 23.1 parts of 5-methoxy-1.3.3-trimethyl-2-methylene-indoline-ω-aldehyde and 38.2 parts of 5-methoxy-2-methyl-benzselenazol-iodine-ethylate (selenium position numbered one) are boiled in pyridine as described in Example 4. There is obtained a dyestuff which dyes wool and tanned cotton violet tints.

(6) 33.3 parts of 2.5.6-trimethylbenzthiazol-iodine-ethylate are condensed with 22.9 parts of 1.3.3.5.6-pentamethyl-indoline-2-methylene-ω-aldehyde as described in Example 4. There is obtained a dyestuff which dyes wool and tanned cotton violet-red tints.

(7) By using in Example 6 instead of 2.5.6-trimethylbenzthiazol-iodine-ethylate 31.7 parts of 2.5.6-trimethylbenzoxazol-iodine-ethylate and otherwise proceeding as indicated in that example, a dyestuff is obtained which corresponds to the following formula:

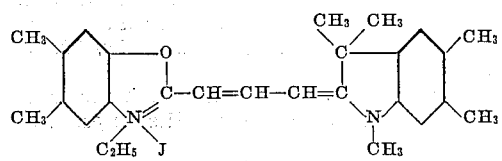

It dyes wool and tanned cotton yellowish red tints.

(8) By using 36.5 parts of 2-methyl-5.6-dimethoxybenzthiazol-iodine-ethylate instead of 2-methylbenzthiazol-iodine-ethylate, mentioned in Example 4, and otherwise proceeding as described in Example 4, a dyestuff is obtained which dyes wool and tanned cotton violet-red tints.

(9) By using instead of 2-methylbenzthiazol-iodine-ethylate, mentioned in Example 4, 34.7 parts of 6-dimethyl-amino-2-methylbenzthiazoliodine-ethylate (sulfur position numbered one) and otherwise proceeding as described in Example 4, a dyestuff is obtained which dyes wool and tanned cotton currant tints.

(10) By using 35.5 parts of 4.5-benzo-2-methyl-benzthiazol-iodine-ethylate instead of 2-methyl-benzthiazol-iodine-ethylate, mentioned in Example 4, and otherwise proceeding as described in Example 4, a dyestuff is obtained which dyes wool and tanned cotton violet-red tints.

(11) 29.9 parts of quinaldine-iodine-ethylate and 20.1 parts of 1.3.3-trimethyl-2-methylene-indoline-ω-aldehyde are boiled for 9 hours under reflux in 500 parts of anhydrous pyridine. After removal of the pyridine, a dyestuff is obtained which, when recrystallized from alcohol, dyes wool violet tints. By using instead of quinaldine-iodine-ethylate other quaternary salts of quinaldine or quaternary salts of quinaldine derivatives which contain in the benzene nucleus of the quinaldine substituents such as methyl, methoxyl, ethoxyl, dimethylamino or diethylamino groups, similar dyestuffs are obtained.

(12) By using instead of the quinaldine-iodine-ethylate mentioned in Example 11 the equal weights of lepidine-iodine-ethylate and proceeding as indicated in Example 11, a dyestuff is obtained which dyes wool and tanned cotton clear light-blue tints.

By using instead of lepidine-iodine-ethylate other quaternary salts of lepidine or such derivatives of lepidine as are substituted in the benzene nucleus by methyl, methoxyl, ethoxyl, dialkylamino or other groups, similar blue dyestuffs are obtained.

(13) 27.7 parts of 5-phenyl-1.3.3-trimethyl-2-methylene-indoline-ω-aldehyde and 22.8 parts of 2-methylbenzoxazol-bromine-methylate are boiled in pyridine as indicated in Example 4. There is obtained a dyestuff which dyes wool and tanned cotton red tints and which has the following constitution:

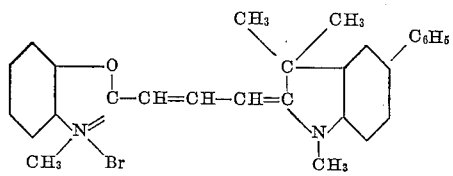

(14) 21.5 parts of 1.3.3.5-tetramethyl-2-methylenindoline-ω-aldehyde and 31.9 parts of 6-methoxy-2-methylbenzoxazol-iodine-ethylate are condensed in pyridine as indicated in Example 4. There is obtained a dyestuff which dyes wool and tanned cotton red tints and which has the following constitution:

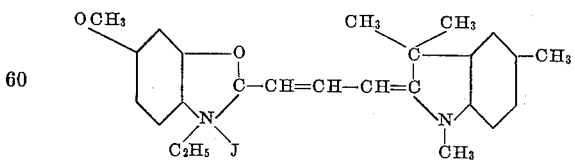

By using instead of the indoline-2-methylene-ω-aldehydes mentioned in the foregoing examples aldehydes from more highly alkylated indolines, for instance, the ethyl derivatives, or from such indolines as contain in the benzene nucleus further substituents, for instance, the $NO_2$, $NH_2$, an alkyl or O-alkyl group or as contain a naphthalene nucleus, similar dyestuffs are obtained.

We claim:

1. The process which comprises boiling under reflux for about 1½ hours a solution of 2.5.6-trimethylbenzoxazol-iodine-ethylate and 1.3.3.5.6-pentamethylindolin-2-methylen-ω-aldehyde in anhydrous pyridine.

2. The process which comprises boiling under reflux for about 1½ hours a solution of 2-methylbenzoxazol-bromo-methylate and 5-phenyl-1.3.3-trimethyl-2-methylenindolin-ω-aldehyde.

3. The process which comprises boiling under reflux for about 1½ hours a solution of 6-methoxy-2-methyl-benzoxazol-iodine ethylate and 1.3.3.5-tetra-methyl-2-methylenindolin-ω-aldehyde.

4. The process which comprises condensing an aldehyde compound of the general formula:

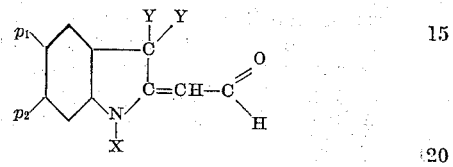

wherein X means a substituent of the group consisting of methyl and ethyl, the two Y's mean identical alkyl radicals of the group consisting of methyl and ethyl and $p_1$ and $p_2$ represent members of the group consisting of hydrogen, methyl, ethyl, methoxy, ethoxy, amino, dimethylamino, diethylamino and phenyl with a compound of the general formula:

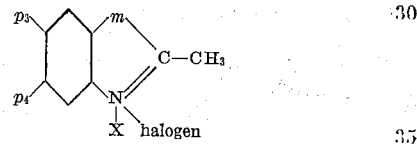

wherein X means a substituent of the group consisting of methyl and ethyl, m means a member of the group of bivalent values consisting of =C(methyl)$_2$, —O—, —S—, —Se— and —CH=CH and $p_3$ and $p_4$ represent members of the group consisting of hydrogen, methyl, ethyl, methoxy, ethoxy, amino, dimethylamino, diethylamino and phenyl.

5. The process which comprises boiling in presence of a solvent an aldehyde compound of the general formula:

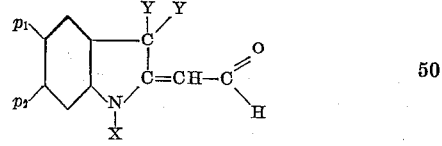

wherein X means a substituent of the group consisting of methyl and ethyl, the two Y's mean identical alkyl radicals of the group consisting of methyl and ethyl and $p_1$ and $p_2$ represent members of the group consisting of hydrogen, methyl, ethyl, methoxy, ethoxy, amino, dimethylamino, diethylamino and phenyl with a compound of the general formula:

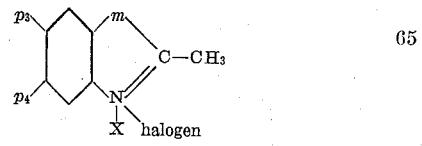

wherein X means a substituent of the group consisting of methyl and ethyl, m means a member of the group of bivalent values consisting of =C(methyl)$_2$, —O—, —S—, —Se— and —CH=CH— and $p_3$ and $p_4$ represent members of the group consisting of hydrogen, methyl, ethyl, methoxy, ethoxy, amino, dimethylamino, diethylamino and phenyl.

6. The process which comprises condensing an aldehyde compound of the general formula:

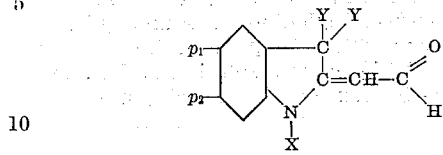

wherein X means a substituent of the group consisting of methyl and ethyl, the two Y's mean identical alkyl radicals of the group consisting of methyl and ethyl and $p_1$ and $p_2$ represent members of the group consisting of hydrogen, methyl, ethyl, methoxy, ethoxy, amino, dimethylamino, diethylamino and phenyl with a compound of the general formula:

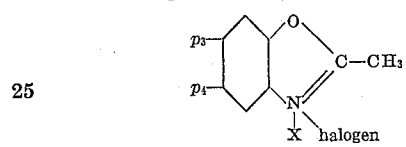

wherein X means a substituent of the group consisting of methyl and ethyl and $p_3$ and $p_4$ represent members of the group consisting of hydrogen, methyl, ethyl, methoxy, ethoxy, amino, dimethylamino, diethylamino and phenyl.

7. The process which comprises boiling in presence of a solvent an aldehyde compound of the general formula:

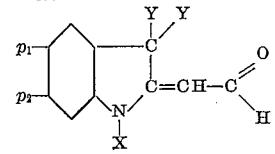

wherein X means a substituent of the group consisting of methyl and ethyl, the two Y's mean identical alkyl radicals of the group consisting of methyl and ethyl and $p_1$ and $p_2$ represent members of the group consisting of hydrogen, methyl, ethyl, methoxy, ethoxy, amino, dimethylamino, diethylamino and phenyl with a compound of the general formula:

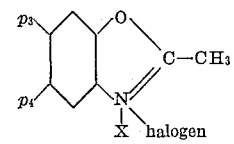

wherein X means a substituent of the group consisting of methyl and ethyl and $p_3$ and $p_4$ represent members of the group consisting of hydrogen, methyl, ethyl, methoxy, ethoxy, amino, dimethylamino, diethylamino and phenyl.

PAUL WOLFF.
ADOLF SIEGLITZ.